United States Patent [19]

Hebert, Jr.

[11] 3,771,064

[45] Nov. 6, 1973

[54] BIDIRECTIONAL SIGNAL PROCESSING MEANS

[75] Inventor: Eugene J. Hebert, Jr., Elkins Park, Pa.

[73] Assignee: American Electronic Laboratories, Inc., Colmar, Pa.

[22] Filed: July 3, 1972

[21] Appl. No.: 268,878

[52] U.S. Cl. .......................... 333/1, 333/10, 333/11, 333/70 R

[51] Int. Cl. ........ H01p 5/14, H03h 7/04, H03h 7/46

[58] Field of Search ........................ 333/10, 11, 1, 4, 333/5, 6, 70 R; 179/2 R, 2 C, 15

[56] References Cited

UNITED STATES PATENTS

| | | | |
|---|---|---|---|
| 1,413,357 | 4/1922 | Raibourn | 333/11 X |
| 1,518,495 | 12/1924 | Espenschied | 333/11 X |
| 1,571,010 | 1/1926 | Kendall | 333/6 X |
| 1,616,193 | 2/1927 | Mills | 333/6 |
| 1,757,729 | 5/1930 | Mathes | 333/14 |

FOREIGN PATENTS OR APPLICATIONS

| | | | |
|---|---|---|---|
| 405,026 | 1/1934 | Great Britain | 178/44 |

*Primary Examiner*—Rudolph V. Rolinec
*Assistant Examiner*—Marvin Nussbaum
*Attorney*—Jacob Trachtman

[57] ABSTRACT

A bidirectional signal processing means comprising a first directional coupling means having first, second, and third terminals, input signals received at the first terminal being delivered to the second and third terminals, while signals received at the second terminal are delivered to the first terminal of the coupling means with the delivery of such signals to its third terminal being minimized. Input signals received at the third terminal of the first directional coupling means are delivered to its first terminal and the amplitude of such signals delivered to its second terminal is minimized. A first filter unit receives signals from the second terminal of the first coupling means and delivers signals at its output which have frequencies within a first band of frequencies, and a second filter unit receives and delivers signals to the third terminal of the first coupling means which have frequencies in a second band of frequencies contingent to and differing from the frequencies of the first band. Amplifying means receive signals delivered by the first filter unit and delivers amplified output signals having frequencies within the first band while attenuating signals with frequencies within the second band. A second amplifying means delivers amplified output signals, to the second filter unit for input signals having frequencies within the second band while attenuating signals with frequencies within the first band. A second directional coupling means has first, second and third terminals with the first terminal delivering signals which it receives to the second and third terminals, while the input signals received at its second terminal are delivered to its first terminal and the amplitude of such signals delivered to its third terminal is minimized. Input signals received at its third terminal are delivered to its first terminal while the amplitude of such signals delivered to its second terminal is minimized. A third filter unit receives signals from the first amplifying means and delivers signals to the second terminal of the second coupling means which have frequencies within the first band of frequencies, while a fourth filter unit receives signals from the third terminal of the second coupling means and delivers signals to the second amplifying means which have frequencies within the second band of frequencies.

15 Claims, 9 Drawing Figures

BIDIRECTIONAL SIGNAL PROCESSING MEANS

Figure 1:
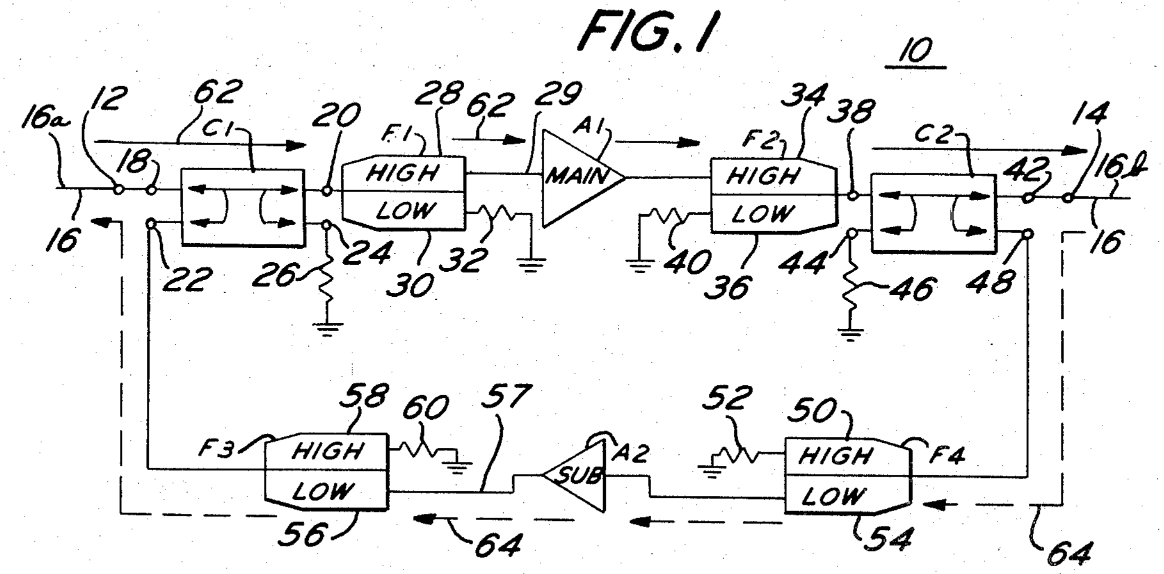

The invention relates to bidirectional signal processing means, and more particular to such processing means used in connection with television signals transmission networks.

It has become very useful and necessary in many instances to provide quality signal transmission in the television frequency range in two directions over a single cable system. In order to construct a quality bidirectional cable CATV system, it is necessary that the input and output of the main trunk modules be provided with diplexing filters which split the total frequency range into two bands, namely a high band and a low band. Thus, for example, signals in a high band of 50 MHz to 300 MHz may be transmitted in one direction along a cable, while signals in the low band, such as 6 MHz to 32 MHz are transmitted over the same conductor system in the opposite direction. In order to amplify such signals which become attenuated by travel along the cable, the signals in the low and high bands must be separated for amplification by respective amplifiers which are arranged to provide their output at opposite ends of the signal processing means for transmission in opposite directions. In this regard, it is important that end-around effects, such as the transmission of signals in the inproper direction along the cable, be minimized in the processing means to avoid serious distortion and degradation of signals.

Diplexing filters used for processing such bidirectional signals must include the technical requirements that, in the range of the high and low bands, the processing means does not produce amplitude ripples or any amplitude roll-off in these bands. Such bidirectional signal processing means must also provide an impedance match over the two bands of frequencies to minimize return loss of signals to less than 20 db. Insertion loss, especially in the high band, must be minimal with 0.5 db desirable and 0.8 db acceptable.

The bidirectional signal processing means must provide minimum differential phase shift or differential time or group delay over the pass bands with less than 0.5 nanoseconds as desirable and less than 2.0 nanoseconds as acceptable. The isolation between the high band and low band outputs must be as great as possible with 50 db per processing means over the high and low bands as acceptable and 60 db as desirable.

The bidirectional signal processing means must also be stable as a function of time, temperature and under shock and vibration. Temperature changes over a period of 30 minutes or more, must be tolerated in the ranges of −40° to +60°C, and all handling and shipping shock and vibration must be withstood without any compensating adjustments. The units must remain stable within specifications for 10 years or more without maintenance.

Another important requirement is that the signal processing means be producable with small misadjustments and component changes which do not have a deleterious effect on the above parameters, allowing reduced time and effort for production and maintaining the production costs at a minimum.

The importance of the above requirements will be evident from the fact that the bidirectional signal processing means are used in cascade arrangement, so that a signal may be required to pass through a large plurality of such devices in being transmitted from one location to another. Thus, the requirement for maintaining the amplitude flatness across the high and low bands are most important, since variation in amplitude will be additive and is particularly objectionable, if it occurs in the form of a "signature" (always occuring at the same frequency) which is common in many filter designs. Even a 0.05 db signature will cause serious amplitude deviations in a cascade arrangement of devices. For example, a 0.05 db signature over a 40 amplifier cascade will cause a 2 db amplitude variation. As many systems must be flat to ± 1.5 db at the end of the longest cascade, a 2 db signature provided by the filters would be a serious deviation allowing only a 0.5 db tolerance for all other variables in a system combined.

The impedance requirement if not maintained, causes reflections from station to station, which if large and/or numerous, will deteriorate the resolution of the video signal so that it results in a blurry picture. The minimal impedance mismatch per station presently acceptable in the industry is −16 db return loss. It is desirable to have the devices contribute better than −16 db return loss when properly loaded.

Insertion loss in the through pass bands, affects both the noise figure of the station and the intermodulation distortion of the station. Any insertion loss on the input is directly added to a noise figure, while any insertion loss on the output causes the station amplifiers to run at a higher level to compensate for the loss, thus increases the intermodulation distortion.

Differential phase shift or the difference in the time delay of propagation between different frequencies, if allowed to increase in a system will cause color misregistration, also known as the comic page effect, because the chroma carrier is not propagated through the system at the same velocity as the video carrier. It has been experimentally indicated that 120 nanoseconds differential delay is all that can be tolerated before there is objectionable color shift. Allowing a high-band and low-band differential delay of 2 nanoseconds for the worst case, the system would be limited to 30 stations in cascade, for transmission of the same signal from one location or station to a second and return from the second to the first station.

It is most important that isolation be maintained around the main or high through pass amplifier and around the low or sub-band amplifier. Thus, if there is a net gain of 30 db in each amplifier in its pass-band, and attenuation of 20 db outside of its pass-band, the diplexers or high and low band filters must provide a isolation of 70 db to provide a net isolation of 60 db. The net isolation of 50 db is considered the minimum, while an isolation of 60 db is desirable. Since the processing means is usually operated at 22 to 25 db gain, this would increase the net isolation in practice to 65 to 68 db, an amount even better than that considered to be the desirable.

The processing means must be readily reproducible, and stable in time and temperature without expensive alignment procedures, while the bidirectional processing means meets all of the desirable operating parameters noted above with simple band-pass and voltage-standing-wave-ratio (VSWR) alignment. Such a processing means must contain a filter which has a limited number of sections and is of the type providing the required properties noted above.

Heretofore, such bidirectional signal processing means have included highly complex multisection filters, which have required exacting alignment and adjustment to achieve the required properties including isolation of the high and low band signals. Such devices are expensive to manufacture and require realignment and maintenance to retain the desirable operative properties.

It is, therefore, a principle object of the invention to provide a new and improved bidirectional signal processing means easily meeting the requirements for high quality signal transmission while utilizing simple non critical and inexpensive filters of few sections which may easily be aligned.

Another object of the invention is to provide a new and improved bidirectional signal processing means which is highly stable, requires a minimum of maintenance and is inexpensive to produce and operate.

The above objects and requirements are achieved by providing a bidirectional processing means utilizing a first directional coupling means having first, second and third terminals, the first terminal delivering input signals which it receives to the second and third terminals, while signals received at the second terminal are delivered to the first terminal of the coupling means with the delivery of such signals to its third terminal being minimized. Input signals received at the third terminal of the first directional coupling means are delivered to its first terminal and the amplitude of such signals delivered to its second terminal minimized.

A first filter unit receives signals from the second terminal of the first coupling means and delivers signals at its output which have frequencies within a first or main band of frequencies, and a second filter unit receives and delivers singals to the third terminal of the first coupling means which have frequencies in a second band or sub-band of frequencies contingent to and differing from the frequencies of the first band. Amplifying means receive signals delivered by the first filter unit and delivers amplified signals at its output for signals having frequencies within the first band while attenuating signals with frequencies within the second band. A second amplifying means delivers amplified signals at its input to the second filter unit for input signals having frequencies within the second band while attenuating signals with frequencies within the first band.

A second directional coupling means has first, second and third terminals with the first terminal delivering signals which it receives to the second and third terminals, while the input signals received at its second terminal are delivered to its first terminal and the amplitude of such signals delivered to its third terminal is minimized. Input signals received at its third terminal are delivered to its first terminal while the amplitude of such signals delivered to its second terminal is minimized. A third filter unit receives signals from the first amplifier means and delivers signals to the second terminal of the second coupling means which have frequencies within the first band of frequencies, and a fourth filter unit receiving signals from the third terminal of the second coupling means and delivers signals to the second amplifier means which have frequencies within the second band of frequencies.

For this arrangement, the first and second directional coupling devices can be, for example, of the quadrature hybrid type commercially produced and available, such as the Magnavox Directional Tap Models No. 1910B and No. 1110D/2-4, and the Cascade Coupler Models No. 706-001-08 and No. 706-001-12. The filter units utilized are of the complementary type providing a high pass section for the high-band joined with a low pass section for the low-band, such as those known as Zobel filters. These filters provide a minimal differential phase shift and have a constant k section and a one-half m matching section for each of the high and low band sections and require a minimum of adjustment and alignment of components. A more complete description of such filters is provided in Chapter 9, particularly pages 358 to 371, of the text entitled "Communication Networks," Volume 2 by Ernst A. Guillemin published by Wiley & Sons, Inc., New York, 1935. The U.S. Pat. No. 1,557,229 and No. 1,557,230 also disclose such filter networks.

Figure 2:
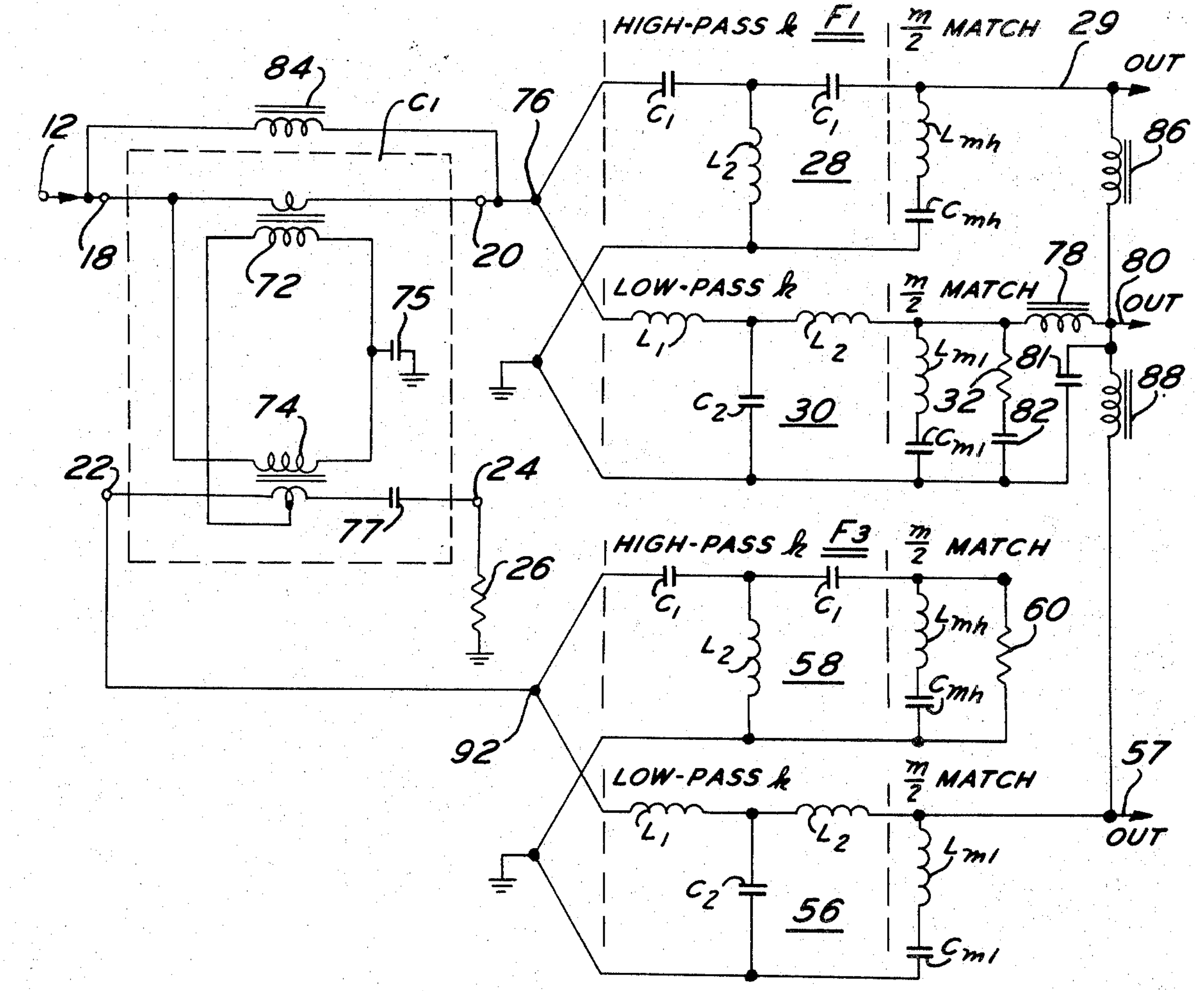
Figure 3A:
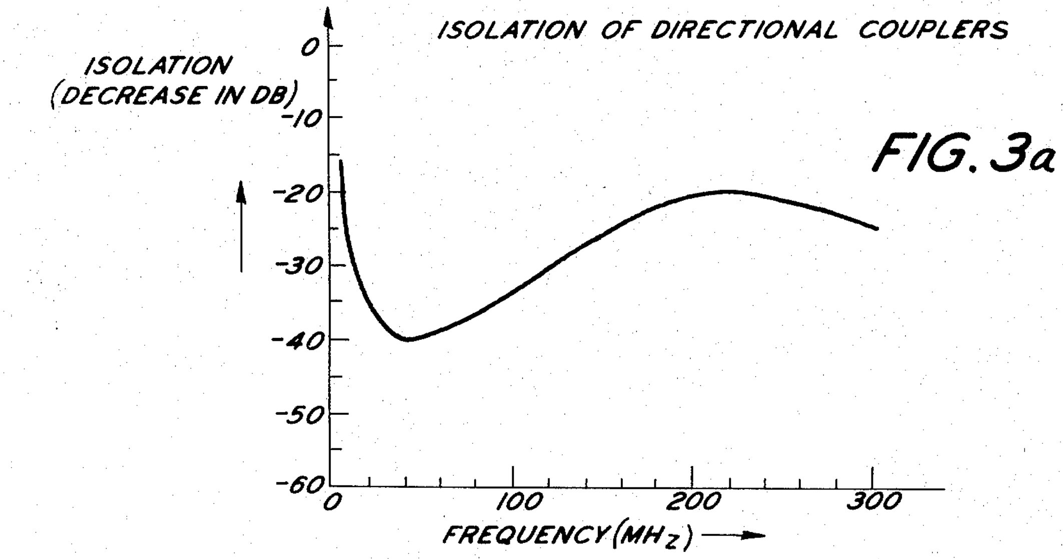
Figure 3B:
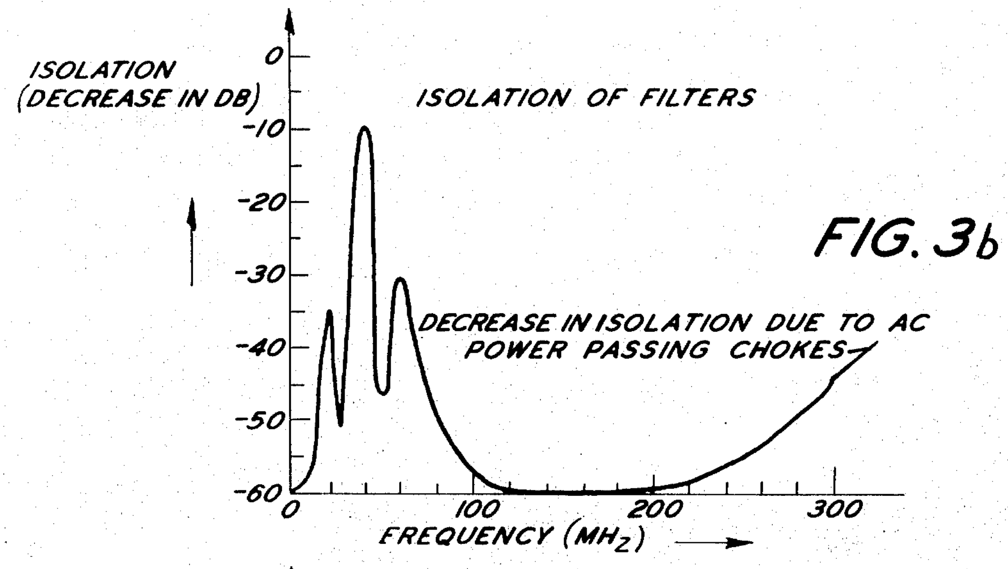
Figure 3C:
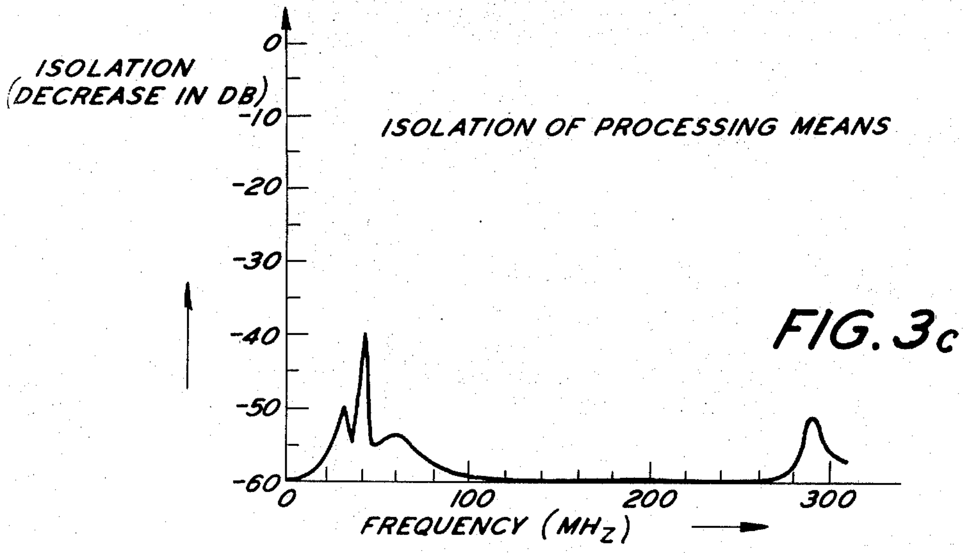
Figure 4:
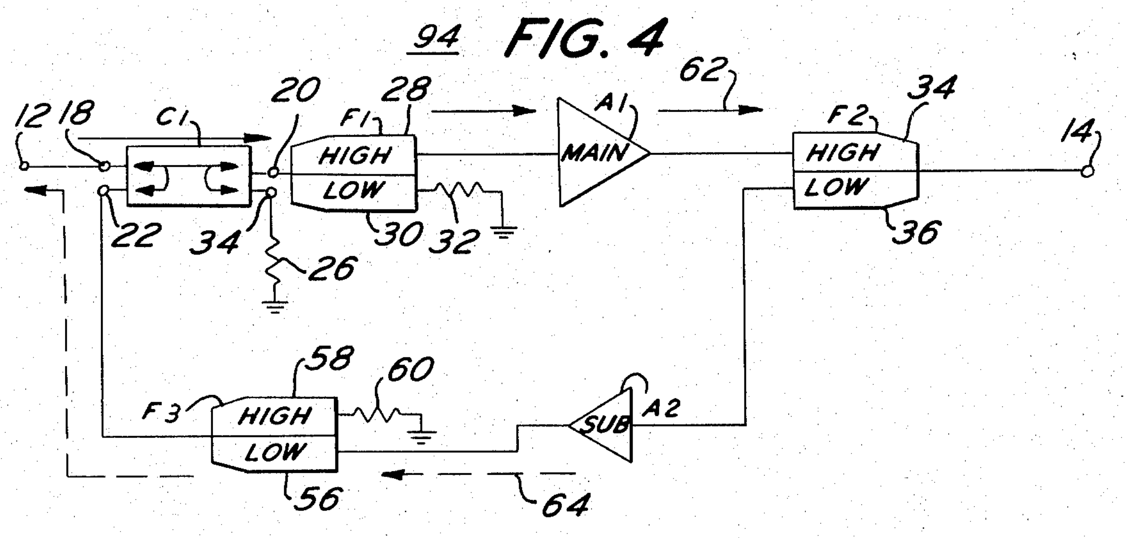
Figure 5:
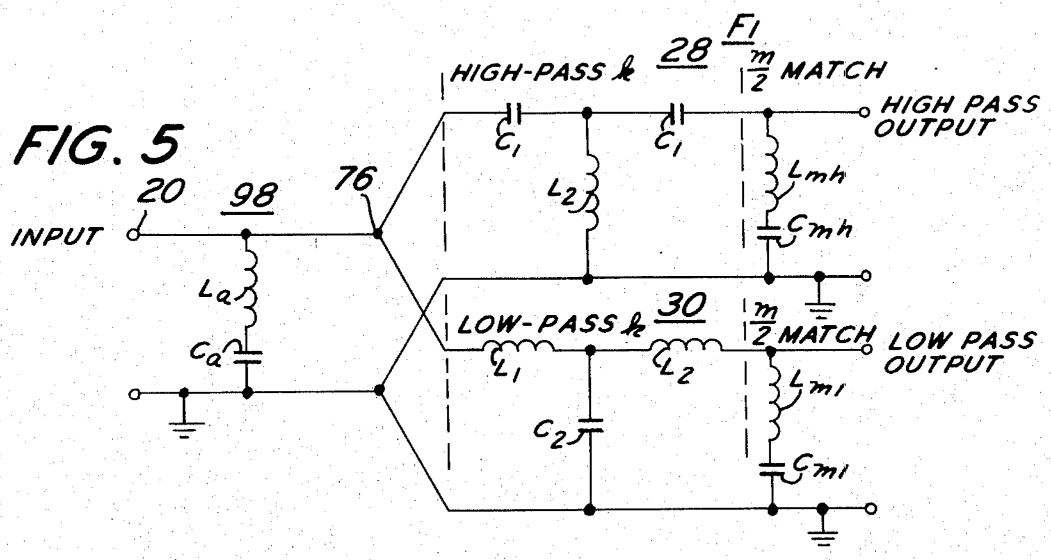
Figures 6A, 6B:
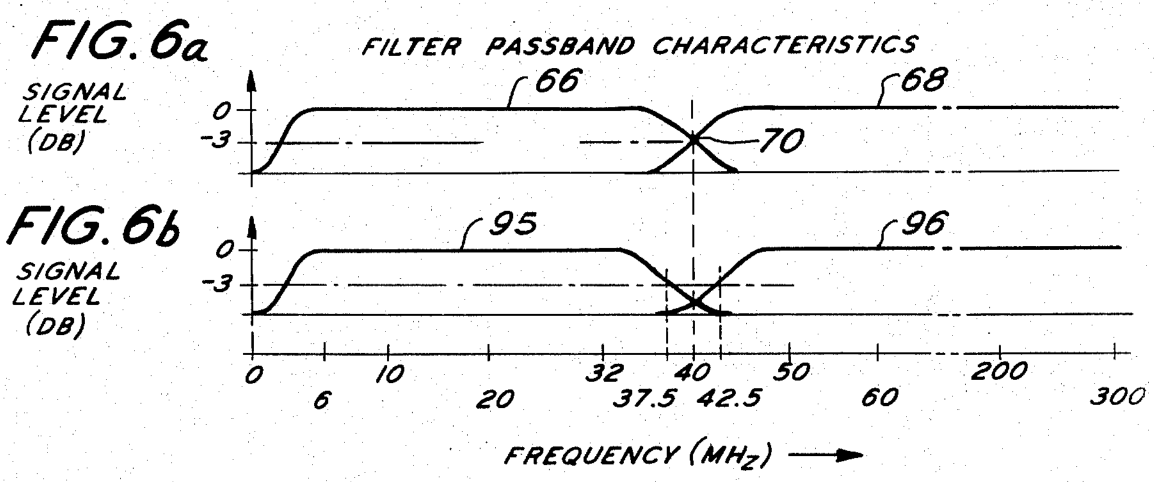

The foregoing and other objects of the invention will become more apparent as the following detailed description of the invention is read in conjunction with the drawing, in which:

FIG. 1 is a block diagram illustrating a bidirectional signal processing means embodying the invention, FIG. 2 is a schematic drawing of a portion of the signal processing means shown in FIG. 1, FIGS. 3*a*, 3*b* and 3*c* each graphically illustrate the isolation properties of the signal processing means and portions thereof, FIG. 4 is a block diagram of a modified form of the bidirectional signal processing means shown in FIG. 1, FIG. 5 is a schematic drawing illustrating a portion of the bidirectional signal processing means shown in FIG. 4, and FIG. 6*a* illustrates the filter band-pass characteristic of the bidirectional signal processing means shown in FIG. 1, while FIG. 6*b* graphically illustrates the filter band-pass characteristics of the modified form of bidirectional signal processing means shown in FIG. 4.

Like reference numerals designate like parts throughout the several views.

Refer to FIG. 1 which is a block diagram illustrating a bidirectional signal processing means 10 embodying the invention. The processing means 10 includes an input-output terminal 12 at one end and an input-output terminal 14 at the other end. The means 10 is inserted in a cable 16 by having its terminal 12 connected with the end 16*a* of the cable 16, while its other terminal 14 is connected with the end 16*b*. The cable 16 may be of the type utilized for transmission of high frequency signals, such as television signals distributed in a single cable CATV system. The bidirectional signal processing means 10 is inserted in the cable for the purpose of processing the signals by amplifying and correcting changes produced in the signal by its transmission along the cable. The location of such a signal processing means 10 is generally designated a station along the transmission cable. Since it has become desirable to transmit signals in both directions along a single cable, high or main band signals are generally transmitted in one direction, while low or sub-band signals are transmitted in the opposite direction. By convention, the signals in the high band generally extend from 50 MHz to 300 MHz, while the low or sub-band signals have frequencies extending from 6 MHz to 32 MHz. At the station illustrated in FIG. 1, the main band signals are transmitted along the cable 16 from left to right, while the sub-band signals are transmitted in the opposite direction from right to left.

The main band signals transmitted along the cable 16 are delivered to the terminal 12 of the processing means 10 and are received at a terminal 18 of a directional signal coupler C1. Such signals received at terminal 18 of the coupler C1 are delivered to a terminal 20 and a tap terminal 22 of the coupler C1. However, the amplitude of these signals is minimized at a tap terminal 24 of the coupler C1 which terminal is terminated by the characteristic impedance of the cable 16 by a resistor 26 returned to ground potential. The coupler C1 is also characterized in that input signals delivered to its terminal 20 are transmitted by it to the terminal 18 and tap terminal 24, while the amplitude of such signals to the tap terminal 22 is minimized. Such couplers are known as quadrature hybrid type couplers. Such couplers are available as Magnavox Directional Tap Model No. 1910B providing −8 db taps at terminals 22 and 24, while Model No. 1110B/2–4 provides −10 db taps at terminals 22 and 24. Similarly, the Cascade Coupler Model 706-001-08 which provides − 8 db taps and Model No. 706-001-12 which provides −12 db taps at terminals 22 and 24 can be used for the couplers C1 and C2. For the embodiment illustrated, the coupler C1 provides −10 db taps at the terminals 22 and 24 although other tap values may be desirable depending upon design considerations and the above and other commercially available couplers may be used for the couplers in the signal processing means 10.

The signal delivered by the coupler C1 to its tap terminal 20 is received by a diplexer filter F1 having a high or main-band section 28 and a low or sub-band section 30 joined in common to the input terminal 20. The high section 28 of the fliter F1 passes signals in the high band over its output line 29 to a main band amplifier A1, while attenuating signals received at terminal 20 which are in the low band. Low band signals, on the other hand, are passed through the low section 30 of the filter F1 to a termination resistor 32 returned to ground and providing the characteristic impedance for the filter F1 and the cable 16.

The main band amplifier A1 amplifies input signals within the high band by approximately 22 to 30 db and delivers amplified output signals to the high section 34 of a diplexer fliter F2, while attenuating the signals which have a frequency outside of the main band.

The filter F2 may be identical with the filter F1 and has its high section 34 joined with a low section 36 at a common terminal 38 of a second directional coupler C2. The other end of the low section 36 of the filter F2 is also terminated by a resistor 40 providing the characteristic impedance returned to ground potential.

The directional coupler C2, which may be identical to the directional coupler C1, delivers signals received at its terminal 38 to terminal 42 and tap terminal 44. The terminal 42 is connected to the input-output terminal 14 of the signal processing means 10 which joins the cable 16 at the end 16*b*, while the terminal 44 is returned to ground by a resistor 46 providing the characteristic impedance for the network.

Signals in the low or sub-band which are delivered at the end 16*b* of the cable 16 to the input-output terminal 14 of the means 10, are received by the terminal 42 of the coupler C2 and transmitted to the terminal 38 and the tap terminal 48 of the coupler C2. The coupler C2 delivers a −10 db signal at the tap terminal 48, while delivering a minimized signal to the terminated tap terminal 44.

The signals delivered at the tap terminal 48 of the coupler C2 are delivered to the common input of a diplexer filter F4 which may be identical to the other filters. The high section 50 of the filter F4 is returned to ground through a resistor 52 providing the characteristic impedance for the system, while its low section 54 delivers signals in the low band to the input of a sub-band amplifier A2, while attenuating signals in the high band. The sub-band amplifier A2 amplifies signals in the low band, by approximately 22 to 30 db while attenuating signals in the main or high band by 20 db. The output from the amplifier A2 is delivered over its output line 57 to the low section 56 of a diplexer filter F3 which also may be identical with the other diplexer filters. The low section 56 passes the signals in the low band to the tap terminal 22 of the directional coupler C1. The high section 58 has a common input with the low section 56 connected with the tap terminal 22, and is terminated by its characteristic impedance through a resistor 60 returned to ground.

In operation, signals in the high or main band which are transmitted over the cable 16 from left to right are received at the input-output terminal 12 of the bidirectional signal processing means 10 and are processed in the channel indicated by the arrows 62 through the coupler C1, passing through filter F1, amplifier Al, filter F2, and coupler C2 in sequence for delivery to the cable end 16b at the input-output terminal 14. A portion of the high band signal delivered to the terminal 18 is delivered to the tap terminal 22 of the coupler C1. However, the transmission of this signal through the filter F3, sub-band amplifier A2, and filter F4 is minimized. The filter F3 receiving such high band signal at its common terminal passes the signal through the high section 58 to the termination resistor 60, while the low section 56 provides a high loss for signals outside of the low band. Such signals are also delivered to the output of the sub-amplifier A2 which provides further attenuation for the signal as does the low section 54 of the filter F4. This arrangement assures the delivery of the signal only through the main path illustrated by the arrows 62 of the signal processing means 10.

Signals in the sub-band which may be received at the terminal 12 from the cable 16, improperly travelling in the same direction as the main band signals due to reflections or other causes, are passed in the same manner by the coupler C1. Such signals which are delivered at the terminal 20 are attenuated by the high section 28 of the filter F1 and passed by the low section 30 to the terminating resistor 32. The main amplifier A1 further provides attenuation for such signals outside of the high band frequencies while the high section 34 of the filter F2 following the amplifier A1 further attenuates such low band signals. Such sub-band signals travelling in a direction from left to right are thus greatly attenuated when passing through the main band channel indicated by the arrows 62 of the bidirectional signal processing means 10. TThe low band signals delivered by the coupler C1 to the tap terminal 22 are attenuated by the high section 58 and passed through the low section 56 of the filter F3. Such signals are delivered to the output of the sub-band amplifier A2 which attenuates and prevents further transmission of a low band signal to the output terminal 14 of the signal processing means 10 through the filter F4 and coupler C2.

Another highly important consideration for the operation of the signal processing means 10 is the "end around" signal transmission of amplified signals which result in the transmission of a signal in the same direction along the cable 16 providing delayed signals causing loss of definition of the transmitted information which when cascaded renders the signal unusable.

Thus, a signal for instance, in the high band which is received at the input-output terminal 12 and passes through the signal processing means 10 in the channel indicated by the arrows 62 is delivered at the input-output terminal 14 for transmission in the same proper direction along the cable 16. This signal, which has been greatly amplified, if fed back through the path for the low band signals indicated by the arrows and dashed lines 64 would pass through the filter F4, sub-band amplifier A2, and filter F3 to the tap terminal 22, of the coupler C1, through the coupler C1 to the terminal 20 for reprocessing the same main channel and being amplified by amplifier A1 of the signal processing means 10 for travel in the same direction along the cable 16 but delayed with respect to the original amplified signal. Such delayed signals cause the undesirable loss of definition which when repeatedly multiplied and amplified at succeeding stations results in deterioration of the transmitted signal. Such so-called "end around" transmission of the amplified signals is prevented by the high signal isolation between the input-output terminals 12 and 14.

The bidirectional signal processing means 10 provides such high isolation which property is illustrated in connection with the graphs of FIGS. *3a*, *3b* and *3c*. FIG. *3a* represents the isolation provided by directional couplers such as couplers C1 and C2 over the frequency spectrum from 0 to 300 MHz, including the high and low band frequencies. Thus, considering the coupler C2 in the arrangement of FIG. 1, signals in the high band received at the terminal 38 and passing in the direction of the arrows 62 through the coupler C2, are delivered to the terminal 42 for transmission in the proper direction along the cable 16. Delivery of such signals to the terminal 48 from terminal 38 is minimized as graphically illustrated in FIG. 3a by the high isolation provided. Thus, signal attenuation is provided over the high band ranging from a −20 db to −40 db. FIG. *3b* illustrates the additional isolation provided by the diplexer filters, such as by the filter F4 which receives such minimized high band signals which are delivered to the terminal 48 of the coupler C2. The characteristic isolation of the filters, complement the characteristic isolation provided by the directional couplers. This is seen from the fact that the filters provide the greatest isolation for the higher end of the frequency range where the couplers provide the least isolation, while the couplers provide the greatest isolation in the lower frequency range where the filters provide the least isolation. The use of the directional couplers in combination with the filters in the bidirectional signal processing means 10, provides a total net isolation which is illustrated by the curve in FIG. *3c*. The curve of FIG. *3c* combines the characteristics of the curves of FIGS. *3a* and *3b*. From the curve of FIG. *3c* it is noted that a minimum isolation of −50 db is provided while an isolation of −60 db is achieved over most of the frequency range for the high band.

Although the prior art bidirectional processing devices have achieved end around isolation required for proper operation, such devices have required the use of highly complex multi-section filters with precise adjustment and tuning of the filter elements and the realignment of same when detuned in order to achieve the desired isolation. The present signal processing maens, however, achieves the required isolation while using highly simplified complementary filters of the Zobel type which are easily adjusted and inexpensive to produce and maintain in operative condition. The lower isolation provided at the edges of such filters as illustrated in FIG. *3b* is compensated for by the complementary isolation provided by the couplers illustrated in FIG. *3a*. Although additional components are required, the use of less expensive filters which are highly stable and non-critical and provide basically no differential phase shift, still results in a processing means which is less expensive and more desirable than the prior art bidirectional devices.

The same considerations are applicable to sub-band signals travelling in the direction from right to left along the cable 16 and reaching the input-output terminal 14 of the signal processing means 10 over the end **16*b* as were described in detail in connection with high band signals travelling in the opposite direction and received at input-output terminal 12. The channel for such sub-band signals are illustrated by the arrows and dashed lines 64 through the filter F4, sub-amplifier A2 and filter F3 from which it passes to the terminal 22 and through the coupler C1 to the terminal 18 to provide an amplified sub-band signal to the end 16a of the cable 16 which continues to travel in the same direction along the cable. High band signals delivered at the input-output terminal 14 travelling in the same direction as the sub-band signals are attenuated by the processing means 10 in the same manner considered for the low band signals travelling in the same direction as the high band signals which are received at the input-output terminal 12. Similarly high isolation is provided for "end around" signals in which low band signals are amplified by the sub-band amplifier A2 for delivery to the coupler tap terminal 22. Such signals are minimized at the terminal 20** of the coupler C1 as seen from the isolation characteristics for the coupler provided by the FIG. *3a*. Such minimized signals which are delivered to the terminal 20 are passed by low section 30 of the filter F1 for dissipation in the termination resistor 32, while the high section 28 further minimizes the passage of such signals therethrough as illustrated by its band-pass characteristic in FIG. 6a. The curve 66 illustrates the pass-band characteristic for the low section, while the curve 68 provides that for the high section of the diplexer filter. The low and high pass-band characteristics have a crossover point 70 between the low and high bands at the −3 db level, generally considered the cut-off point, which is shown to be at 40 MHz. High attenuation is achieved by the high section of the filter for signals in the low band, while high attenuation is achieved by the low section for signals in the high band with the low band extending from 6 MHz to 32 MHz and the high band extending from 50 MHz to 300 MHz as noted above. The main band amplifier A1 and the high section 34 of the filter F2 following it each further attenuate the low band signal as previously noted.

The bidirectional signal processing means 10 as disclosed, thus, operates to provide two separate channels for signals in respective high and low bands moving in opposite directions along the signal cable 16, while minimizing the reflections, end around signal transmission, and adverse effects such as insertion loss, frequency differential phase effects, and so forth, without requiring the use of highly complex multi-component diplexer filters. The arrangement also provides all of the characteristics and requirements noted previously while minimizing impedance mismatch.

Consider now the schematic drawing of FIG. 2 which shows in detail the circuitry of the coupler C1 connected with the filters F1 and F3. It is noted that this combination is similar to the combination of the coupler C2 with the filters F2 and F4, in view of the symmetry provided in FIG. 1.

The terminal 18 of the coupler C1 is connected to the terminal 20 through the primary winding of a transformer 72. The terminal 18 is also connected through the secondary winding of a transformer 74 to ground potential through an a.c. blocking capacitor 75. The terminal 22 is connected with the terminal 24 of the coupler C1 through the primary winding of the transformer 24 and an a.c. blocking capacitor 77 while the center tap of the primary winding of transformer 74 is returned to ground potential through the secondary winding of the transformer 72 and capacitor 75.

The terminal 20 of the coupler C1 is joined to the common point 76 of the high and low sections 28 and 30 of the filter F1. The high section 28 of the filter F1 comprises a pair of compacitors C1 connected in series between point 76 and the output line 29, while the junction point of the capacitors C1 is returned to ground potential through an inductor L2. The capacitors C1 and inductor L2 provide a single section of a high-pass constant *k* filter with the components tuned to provide the desired high frequency passband as disclosed by the curve 68 in FIG. 6*a*. A matching one-half m filter section is provided by the series connected inductor $L_{mh}$ and capacitor $C_{mh}$ bridging the line 29 to ground potential and follows the high pass constant k section to complete the high section 28 of filter F1.

The low pass constant *k* section of the low section 30 of the filter F1, includes a pair of series connected inductors L1 and L2 joining the common point 76 to the output line 80 through an inductor or choke 78, while the junction point of the inductors L1 and L2 is returned to ground potential through the capacitors C2 providing a single section of the low pass constant *k* filter. The low pass constant *k* filter is followed by a matching one-half m section comprising an inductor $L_{ml}$ in series with a capacitor $C_{ml}$ bridging the junction of inductors L2 and 78 to ground potential. The low section 30 is terminated by the resistor 32 providing the characteristic impedance joined in series with the capacitor 82 which blocks 60 cycle power but passes high and low band frequency signals.

In order to by-pass the bidirectional signal processing means 10, for transmitting 60 cycle energization power along the cable 16, an inductor or choke 84 is bridged across the terminals 18 and 20 of the coupler C1 blocking signals in the low and high bands but permitting passage of the 60 cycle signal. Such power signals which are delivered to the filter F1 pass through the inductors L1 and L2 and the choke 78 to the output line 80 and through similar inductors or chokes 86 and 88, to output lines 29, and 57 for delivery to the amplifiers A1 and A2 requiring energization and to other stations along the cable 16. The inductors or chokes 78, 86 and 88 block the passage of low and high band signals for isolating the lines 29, 80 and 57 from each other with respect to such signals, while the capacitor 81 is connected from the line 80 to ground potential blocking the 60 Hz power signal and by-passing the low and high band signals on the line 80.

The filter F3 has a common point 92 for its sections 56 and 58 which are connected with the terminal 22 of the coupler C1. The high section 58 of the filter F2 is identical to the high section 28 of the filter F1 and is terminated by the resistor 60 providing the characteristic impedance. Similarly the low section 56 of the filter F3 is identical to the low section 30 of the filter F1 but is not terminated as is section 30.

The output line 29 of the high section 28 of filter F1 is connected with the main band amplifier A1 while the low section 30 is terminated by the resistor 32, and the high section 58 of filter F3 is terminated by the resistor 60 while the low section 56 receives signals over the line 57 from the output of the sub-band amplifier A2.

FIG. 4 discloses a bidirectional signal processing means 94 which is a modification of the signal processing means 10 of FIG. 1. The processing means 94 is similar to that of the means 10, but differs from the means 10 by excluding the coupler C2 and filter F4. As before the output of the main band amplifier A1 is delivered to the high section 34 of the filter F2. However, the input-output terminal 14 of the means 94 is connected to the common point of the high and low sections 34 and 36 of the filter F2 and signals from the low section of filter F2 are delivered to the input of the sub-amplifier A2. In order to compensate for the loss of isolation occassioned by the elimination of the coupler C2, and filter F4, the remaining filters F1, F2 and F3 are modified to provide low and high pass-band characteristic illustrated respectively by the curves 95 and 96 of FIG. 6*b*. Increased isolation is achieved by moving the cutoff frequency for pass-band characteristics from the common 40 MHz point to a −3 db cut-off point for the low band for curve 95 at 37.5 MHz and a cut-off frequency of 42.5 MHz for the high band illustrated by curve 96.

Refer to FIG. 5 which is a schematic diagram for the filter F1 of processing means 94, and note that its high and low sections 28 and 30 are identical to those shown in the schematic for the filter F1 of the processing means 10 in FIG. 2. However, the capacitor and inductor elements are now tuned to provide the pass-band characteristics illustrated by the curves 95 and 96 of FIG. 6*b*, in which the cut-off points are not identical at the upper end of the low section and the lower end of the high section, but are separated by 5 MHz. In order to obtain a good impedance match over the entire operative range of frequencies including the range of 5 MHz between the said cut-off points, an annulling network 98 has been added comprising an inductor $L_a$ in series with a capacitor $C_a$ bridged between the common point 76 of the filter F1 and ground potential as shown in FIG. 5. Each of the filters F2 and F3 of the processing means 94 are similarly tuned to provide the high and low band-pass characteristics shown in FIG. 6b and include the annulling network 98 to achieve impedance matching across the entire frequency range including the frequencies 32 to 50 MHz between the high and low bands. The modified form of the bidirectional signal processing means 94, thus, utilizes fewer components and by modified pass-band characteristics and use of the annulling network achieves isolation and other properties desirable for use in the bidirectional CATV transmission network.

Because of the attenuation of signals travelling along the CATV cable which increases as a function of frequency, it may be desirable to eliminate the use of the sub-band amplifier A2 at certain stations along the cable due to the lower loss in the low band signals compared to the loss in the high band signals.

While this invention has been described and illustrated with respect to several specific embodiments, it will be understood that the invention is capable of various modifications and applications, not departing essentially from the spirit thereof, which will become apparent to those skilled in the art.

What is claimed is:

1. A bidirectional signal processing means comprising a first line for receiving signals which have frequencies in a first band of frequencies traveling in a first direction along a bidirectional transmission means and delivering to said transmission means signals which have frequencies in a second band of frequencies for travel in the second direction opposite to said first direction, a second line for receiving signals which have frequencies in the second band of frequencies traveling in the second direction along said transmission means and delivering to said transmission means signals which have frequencies in the first band of frequencies for travel in the first direction, a first directional coupling means having first, second and third terminals, said first terminal receiving signals from and delivering signals to said first line and delivering signals to said second and third terminals of said coupling means, said first coupling means delivering input signals at its second terminal to its first terminal while minimizing the delivery of such signals to its third terminal and delivering input signals at its third terminal to its first terminal while minimizing the delivery of such signals to its second terminal, a first filter unit receiving signals from the second terminal of said first coupling means for delivering to said second line signals at its output which have frequencies within the first band of frequencies and a second filter unit receiving signals derived from said second line and delivering signals to the third terminal of said first coupling means which have frequencies in a second band of frequencies contingent to and differing from the frequencies of said first band.

2. The processing means of claim 1 including unidirectional amplifying means receiving signals delivered by said first filter unit and delivering amplified signals at its output for signals having frequencies within said first band while attenutating the signals with frequencies within said second band.

3. The processing means of claim 1 including unidirectional amplifying means receiving signals derived from said second line and delivering to the second filter unit amplified signals for received signals having frequencies within said second band while attenuating signals with frequencies within said first band.

4. A bidirectional signal processing means comprising a first directional coupling means having first, second and third terminals, said first terminal receiving and delivering signals to said second and third terminals, said first coupling means delivering input signals at its second terminal to its first terminal while minimizing the delivery of such signals to its third terminal and delivering input signals at its third terminal to its first terminal while minimizing the delivery of such signals to its second terminal, a first filter unit receiving signals from the second terminal of said first coupling means and delivering signals at its output which have frequencies within a first band of frequencies, a second filter unit receiving and delivering signals to the third terminal of said first coupling means which have frequencies in a second band of frequencies contingent to and differing from the frequencies of said first band, and a third filter unit having a first terminal receiving signals from said first filter unit, a third terminal for delivering signals to the said second filter unit, and a second terminal, said third filter unit having a first section receiving signals at its first terminal and delivering signals to its second terminal which have frequencies within the first band of frequencies, and a second section receiving signals at its second terminal and delivering signals to its third terminal which have frequencies within the second band of frequencies.

5. The processing means of claim 4 including first amplifying means receiving signals delivered by said first filter unit and delivering amplified signals to the first terminal of said third filter unit for signals having frequencies within said first band while attenuating signals with frequencies within said second band.

6. The processing means of claim 5 including second amplifying means receiving signals from the third terminal of said third filter unit and delivering to the second filter unit amplified signals for signals having frequencies within said second band while attenuating signals with frequencies within said first band.

7. The processing means of claim 4 in which said first, second and third filter units each have first and second sections with a common terminal, said first section passing therethrough signals with frequencies within said first band and attenuating signals with frequencies within said second band, said second section passing therethrough signals with frequencies within the second band and attenuating signals with frequencies in said first band, the common terminal of said first filter unit is connected with the second terminal of said first coupling means, the first section of said first filter unit passes signals with frequencies within said first band from said first coupling means to the first terminal of said third filter while its second section is terminated by the filter characteristic impedance, the common terminal of said second filter unit is connected with the third terminal of said first coupling means, the first section of said second filter unit is terminated by the filter characteristic impedance while its second section passes signals with frequencies within said second band from the third terminal of said third filter unit to the first coupling means, and the second terminal of said third filter unit is the common terminal of its first and second sections.

8. The processing means of claim 7 in which said first band of frequencies is spaced apart from the second band of frequencies and each of the first, second and third filter units is provided at its common terminal with an annulling network for maintaining the characteristic impedance for said units for signals with frequencies between the frequencies of said first and second bands.

9. The processing means of claim 8 including first amplifying means receiving signals delivered by said first filter unit and delivering amplified signals to the first terminal of said third filter unit for signals having frequencies within said first band while attenuating signals with frequencies within said second band.

10. The processing means of Claim 1 including a second directional coupling means having first, second and third terminals, said first terminal receiving signals from said second line and delivering received signals to said second and third terminals, said second coupling means delivering input signals at its second terminal to its first terminal for delivery to said second line while minimizing the delivery of such signals to its third terminal, and delivering input signals at its third terminal to its first terminal while minimizing the delivery of such signals to its second terminal, a third filter unit receiving signals from the first filter unit and delivering signals to the second terminal of said second coupling means which have frequencies within the said first band of frequencies, and a fourth filter unit receiving signal from the third terminal of said second coupling means and delivering received signals to the second filter unit which have frequencies within said second band of frequencies.

11. The processing means of claim 10 including first unidirectional amplifying means receiving signals delivered by said first filter unit and delivering amplified signals to said third filter unit for signals having frequencies within said first band while attenuating signals with frequencies within said second band.

12. The processing means of claim 11 including second unidirectional amplifying means receiving signals from said fourth filter unit and delivering to the second filter unit amplified signals for signals having frequencies within said second band while attenuating signals with frequencies within said first band.

13. A bidirectional signal processing means comprising a first directional coupling means having first, second and third terminals, said first terminal receiving and delivering signals to said second and third terminals, said first coupling means delivering input signals at its second terminal to its first terminal while minimizing the delivery of such signals to its third terminal and delivering input signals at its third terminal to its first terminal while minimizing the delivery of such signals to its second terminal, a first filter unit receiving signals from the second terminal of said first coupling means and delivering signals at its output which have frequenices within a first band of frequencies, a second filter unit receiving and delivering signals to the third terminal of said first coupling means which have frequencies in a second band of frequencies contingent to and differing from the frequencies of said first band, a second directional coupling means having first, second and third terminals, said first terminal receiving and delivering signals to said second and third terminals, said second coupling means delivering input signals at its second terminal to its first terminal while minimizing the delivery of such signals to its third terminal, and delivering input signals at its third terminal to its first terminal while minimizing the delivery of such signals to its second terminal, a third filter unit receiving signals from the first filter unit and delivering signals to the second terminal of said second coupling means which have frequencies within the said first band of frequencies, and a fourth filter unit receiving signal from the third terminal of said second coupling means and delivering signals to the second filter unit which have frequencies within said second band of frequencies, said first, second, third and fourth units each having first and second sections with a common terminal, said first section passing therethrough signals with frequencies within said first band and attenuating signals with frequencies within said second band, said second section passing therethrough signals with frequencies within the second band and attenuating signals with frequencies in said first band, the common terminal of said first filter unit being connected with the second terminal of said first coupling means, and the first section of said first filter unit passing signals with frequencies within said first band from said first coupling means to the first section of said third filter while its second section is terminated by the filter characteristic impedance, the common terminal of said second filter unit is connected with the third terminal of said first coupling means, the first section of said second filter unit is terminated by the filter characteristic impedance while its second section passes signals with frequencies within said second band from the second section of said fourth filter unit to the first coupling means, the common terminal of said third filter unit is connected to the second terminal of said second coupling means, and the second section of said third filter is terminated by the filter characteristic impedance, the common terminal of said fourth filter unit is connected with the third terminal of said second coupling means, and the first section of said fourth filter unit is terminated by the filter characteristic impedance.

14. The processing means of claim 13 including first amplifying means receiving signals from the first section of said first filter unit and delivering amplified signals to the first section of said third filter unit for signals, having frequencies within said first band while attenuating signals with frequencies within said second band, and second amplifying means receiving signals from the second section of said fourth filter unit and delivering to the second section of said second filter unit amplified signals for signals having frequencies within said second band while attenuating signals with frequencies within said first band.

15. The processing means of claim 14 in which said first band includes frequencies from 50 MHz to 300 MHz and said second band includes frequencies from 6 MHz to 32 MHz, the filter units are Zobel type filters and the coupling units are the quadrature hybrid type.

* * * * *